United States Patent [19]

Berger

[11] 3,755,790

[45] Aug. 28, 1973

[54] SECTOR AND ADDRESS TRACK WRITING INSTRUMENT FOR A ROTATING MAGNETIC MEMORY

[75] Inventor: James K. Berger, Sherman Oaks, Calif.

[73] Assignee: Pioneer Magnetics, Inc., Santa Monica, Calif.

[22] Filed: Dec. 22, 1972

[21] Appl. No.: 317,536

Related U.S. Application Data

[63] Continuation of Ser. No. 191,734, Oct. 22, 1971.

[52] U.S. Cl. .......................... 340/172.5, 178/6.6 DD

[51] Int. Cl. .......................... G06f 3/02

[58] Field of Search .......................... 340/172.5, 174.1 A, 340/174.1 L; 178/6.6 D

[56] References Cited

UNITED STATES PATENTS

| | | | |
|---|---|---|---|
| 3,303,471 | 2/1967 | Duncan et al. | 340/172.5 |
| 3,387,276 | 6/1968 | Reichow | 340/172.5 |
| 3,439,343 | 4/1969 | Stahle | 340/172.5 |
| 3,416,140 | 12/1968 | Cassidy, Jr. et al | 340/172.5 |
| 3,500,330 | 3/1970 | Hertz | 340/172.5 |
| 3,531,787 | 9/1970 | Fuller | 340/174.1 A |
| 3,686,639 | 8/1972 | Fletcher | 340/172.5 |
| 3,699,565 | 10/1972 | Nagai | 340/174.1 L X |

*Primary Examiner*—Harvey E. Springborn
*Attorney*—Keith D. Beecher

[57] ABSTRACT

An instrument for providing accurately timed recording signals for the sector and address tracks in the rotating drum or disc-type magnetic memories of digital computers, data processors, and the like; and for performing a wide variety of counting and other functions which are essential in the development, manufacture and maintenance of such computers and data processing. The instrument of the invention has the capability of counting timing bits, or revolutions of the rotating memory of the computer or data processing equipment; and it also has the capability of writing origin pulses, multiple index markers, and sector markers on the drum or disc of such equipment; as well as of copying from one track to another of the memory of such equipment with a variable phase delay, of adjusting bit symmetry in the timing track of the memory in the equipment; and of many other functions. In addition, special plug-in pattern logic boards may be provided for the instrument to enable it to write particular address or sector tracks on the rotating memory of a computer or data processor in accordance with the user's individual specifications.

9 Claims, 10 Drawing Figures

PATENTED AUG 28 1973

3,755,790

SHEET 03 OF 10

(Counter Control/-22-)

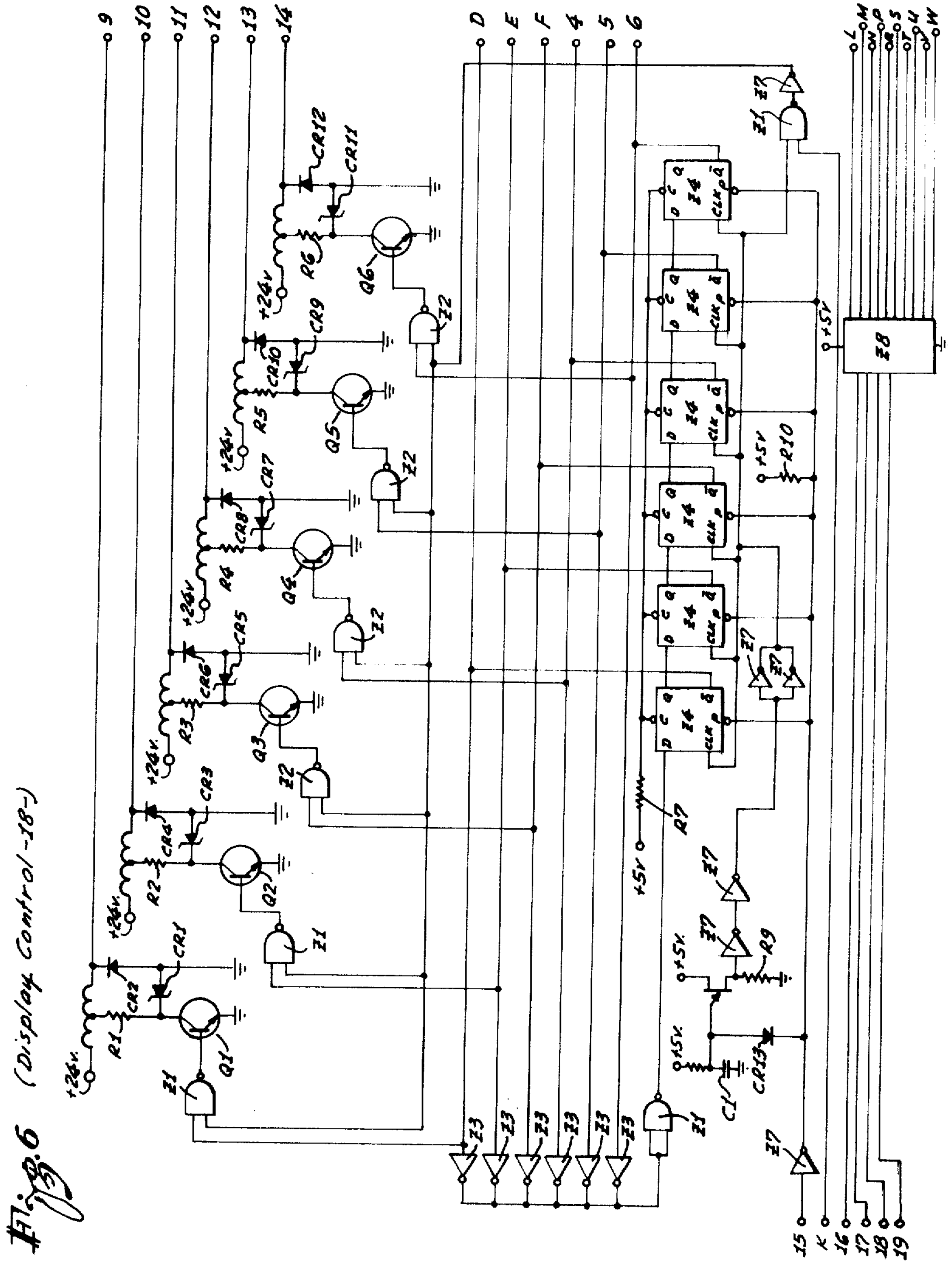
Fig. 6 (Display Control -18-)

PATENTED AUG 28 1973 3,755,790
SHEET 07 OF 10
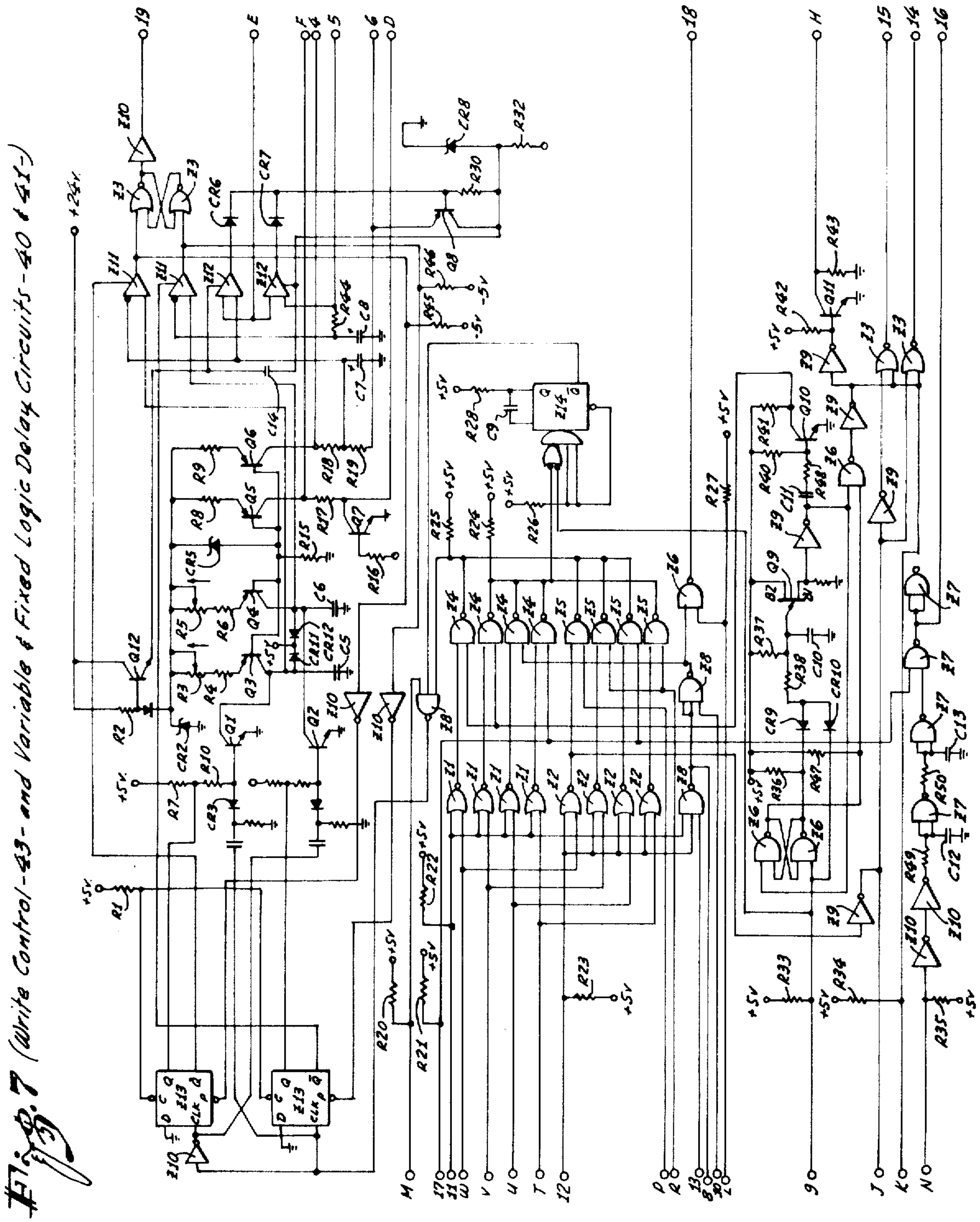
Fig. 7 (Write Control-43- and Variable & Fixed Logic Delay Circuits-40 & 41-)

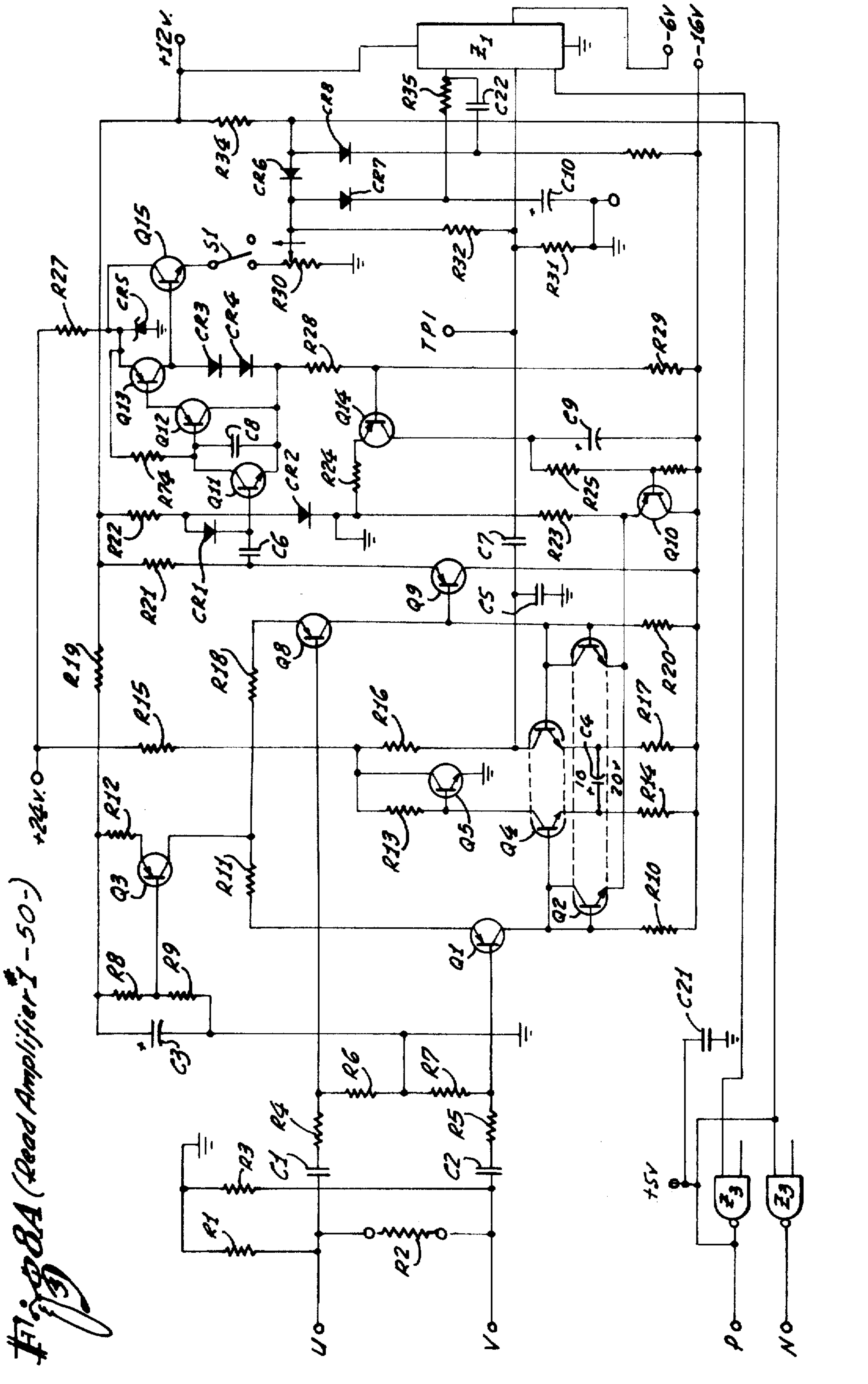
Fig. 8A (Read Amplifier #I-50-)

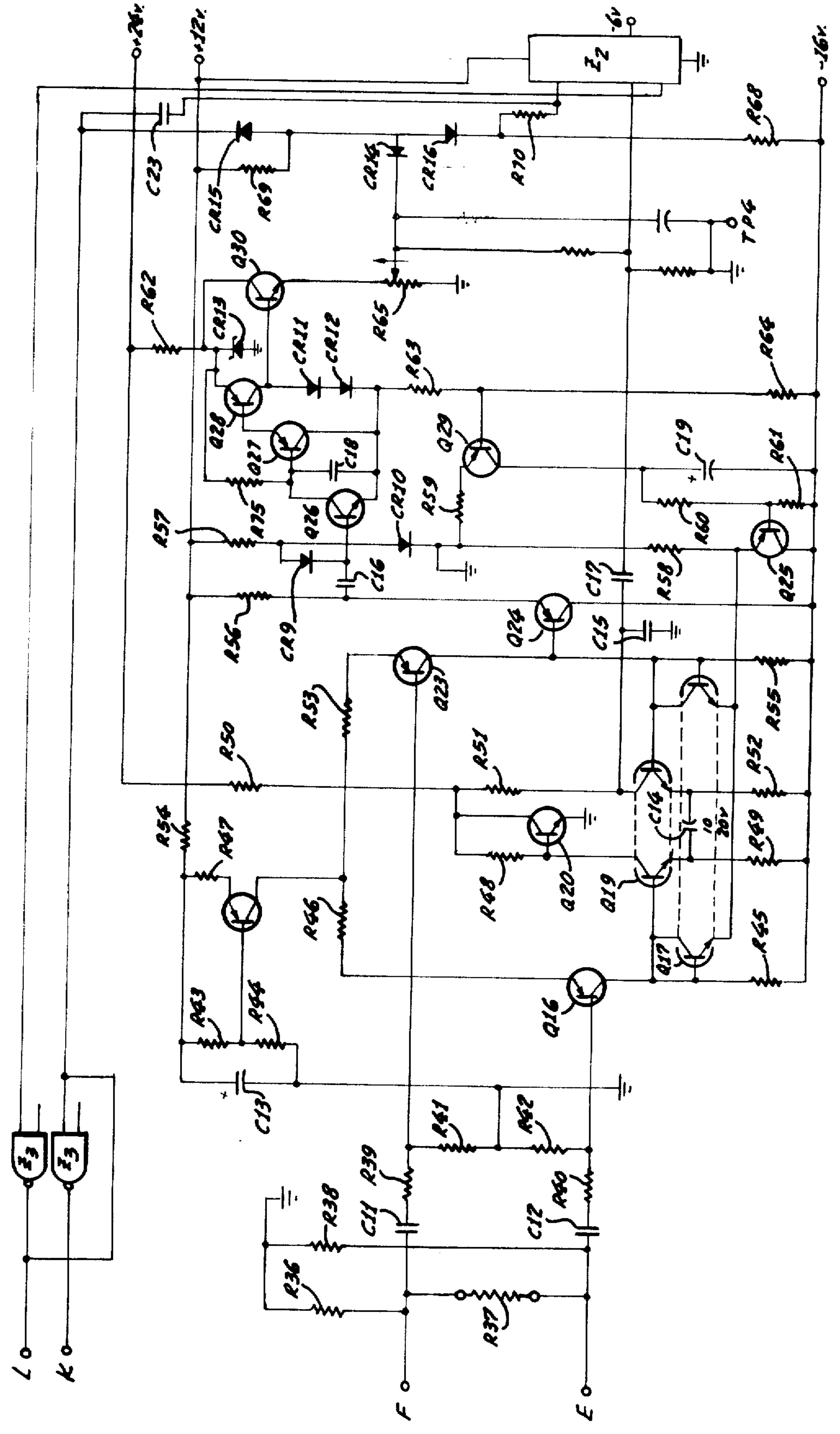
Fig. 8B (Read Amplifier #2-52-)

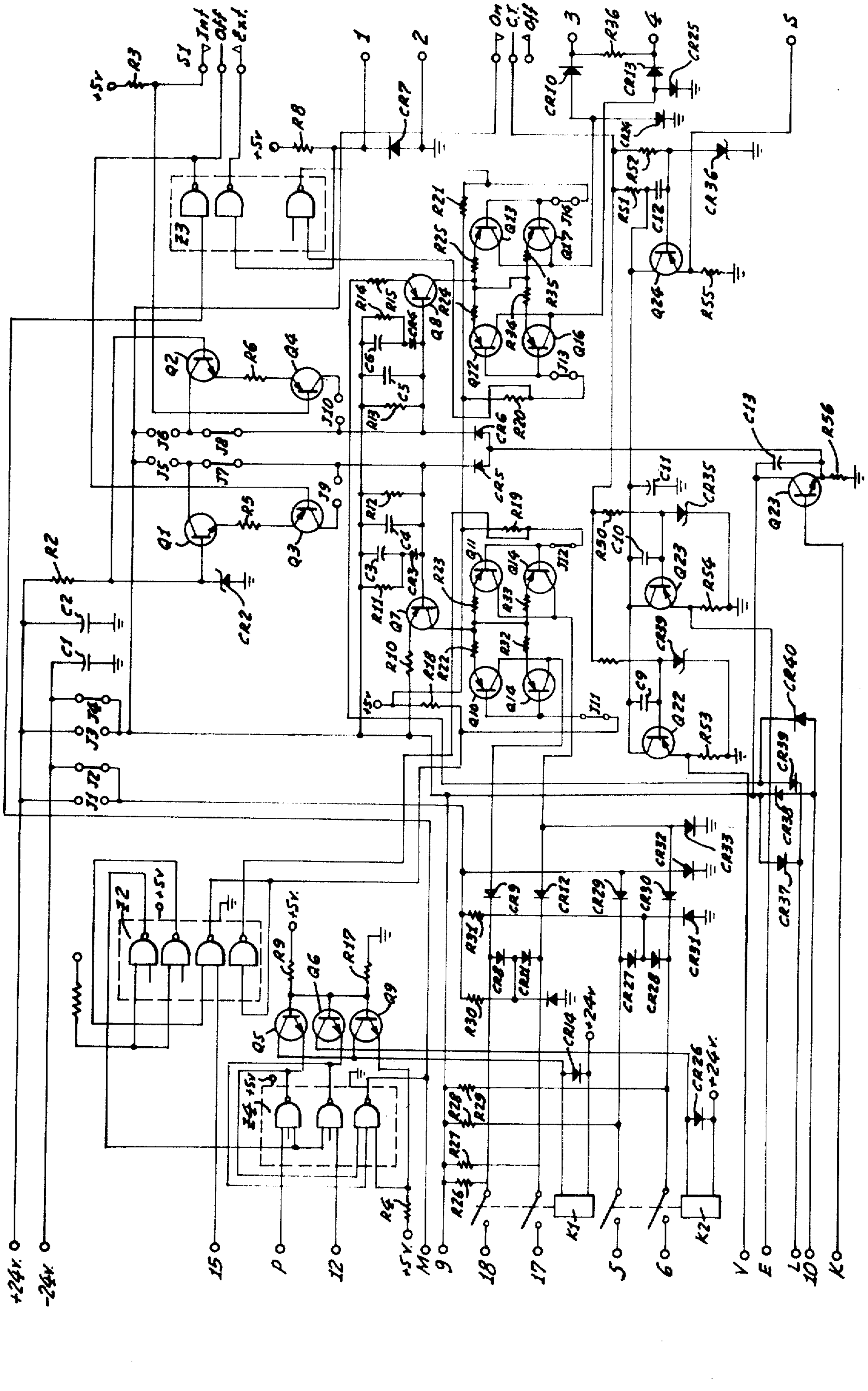
Fig. 9 (Write Amps #1 & #2)

SECTOR AND ADDRESS TRACK WRITING INSTRUMENT FOR A ROTATING MAGNETIC MEMORY

This application is a continuation of Copending Application Ser. No. 191,734 which was filed Oct. 22, 1971.

BACKGROUND OF THE INVENTION

As explained above, the present invention provides an instrument which is intended to be used in conjunction with rotating disc or drum memories of digital computer and data processing equipment, so that appropriate timing signals, and other data, may be wrutten by the instrument into the memories of such equipment.

Rotating disc and drum memory systems in such digital computers and data processors, for example, often require certain address and control data to be permanently recorded on one or several memory tracks. Such tracks serve as a reference to locate storage locations on the memory, and they also act as a timing means to enable the memory system to gate input and output data onto and from the proper storage locations on the memory of the equipment.

The recording of the sector and address into corresponding tracks of the rotating magnetic memory of a typical data processor or digital computer usually requires relatively elaborate logic networks in order to generate the particular bit patterns for such tracks. Moreover, since the logic networks are rarely the same for any two memory systems, it is usual in the prior art to design and fabricate a specific logic network to write the required information in the sector and/or address tracks for any particular memory in a computer or data processor. Such logic networks are usually made up on a temporary basis, and are rarely maintained intact after the particular equipment for which they are used has been completed.

However, in use, the data in the sector or address tracks of a particular rotating magnetic memory in a digital computer or data processor may become deleted for one reason or another, requiring that the sector or address tracks be re-recorded. In the prior art, however, it was unusual for the particular logic network, which was previously used to write the sector or address data into the rotating memory, to be available.

The present invention provides an instrument for use in conjunction with a wide variety of data processors or digital computers of the type incorporating rotating magnetic drums or discs as memories, and in which all the logic required to write sector or address information, or other timing data, into the rotating memory of a computer or data processor is reduced to a complex but physically small subnetwork. This network is supported by and interconnected with a set of common elements which may be shared with other pattern-generating networks.

It is, of course, possible to construct an instrument for writing signals into the sector of addreass track of a rotating memory, and which contains sufficient component parts to enable the instrument to generate any pattern, and which possesses sufficient switching capabilities to interconnect the components in any conceivable way for any conceivable feasible recording situation. However, such an instrument would necessarily be too large to be portable, and it would be too complex for feasible operation, and too expensive to have any commercial significance. As another approach, a special purpose digital computer could be designed having a core memory, for example, and which would be capable of generating all the required data. However, again the result would be a relatively complex and expensive non-portable instrument.

The instrument of the present invention on the other hand is convenient, inexpensive, and portable; and it may be used in conjunction with a wide variety of sector and address tracks in a wide variety of digital computers or data processors, without the need for any entire logic network, Moreover, the instrument is suitable for use at the site of the particular equipment with which it is to be used. The instrument to be described contains common elements which are shared among many pattern-generating logic sub-networks; and it also contains interconnecting means for receiving individual circuit boards, each of which contains a subnetwork corresponding to an individual pattern. The instrument of the invention has utility, for example, for maintaining the sector and address tracks of a variety of different rotating magnetic memory drum or disc systems in many different digital computers or data processors.

BRIEF DESCRIPTION OF THE DRAWING

FIGS. 4–7 are circuit diagrams of the logic circuitry contained in the various blocks of FIG. 2;

FIGS. 8A and 8B show the details of read amplifiers 1 and 2, respectively; and

FIG. 9 shows the details of write amplifiers 1 and 2.

DETAILED DESCRIPTION OF THE ILLUSTRATED EMBODIMENT

Figure 1:
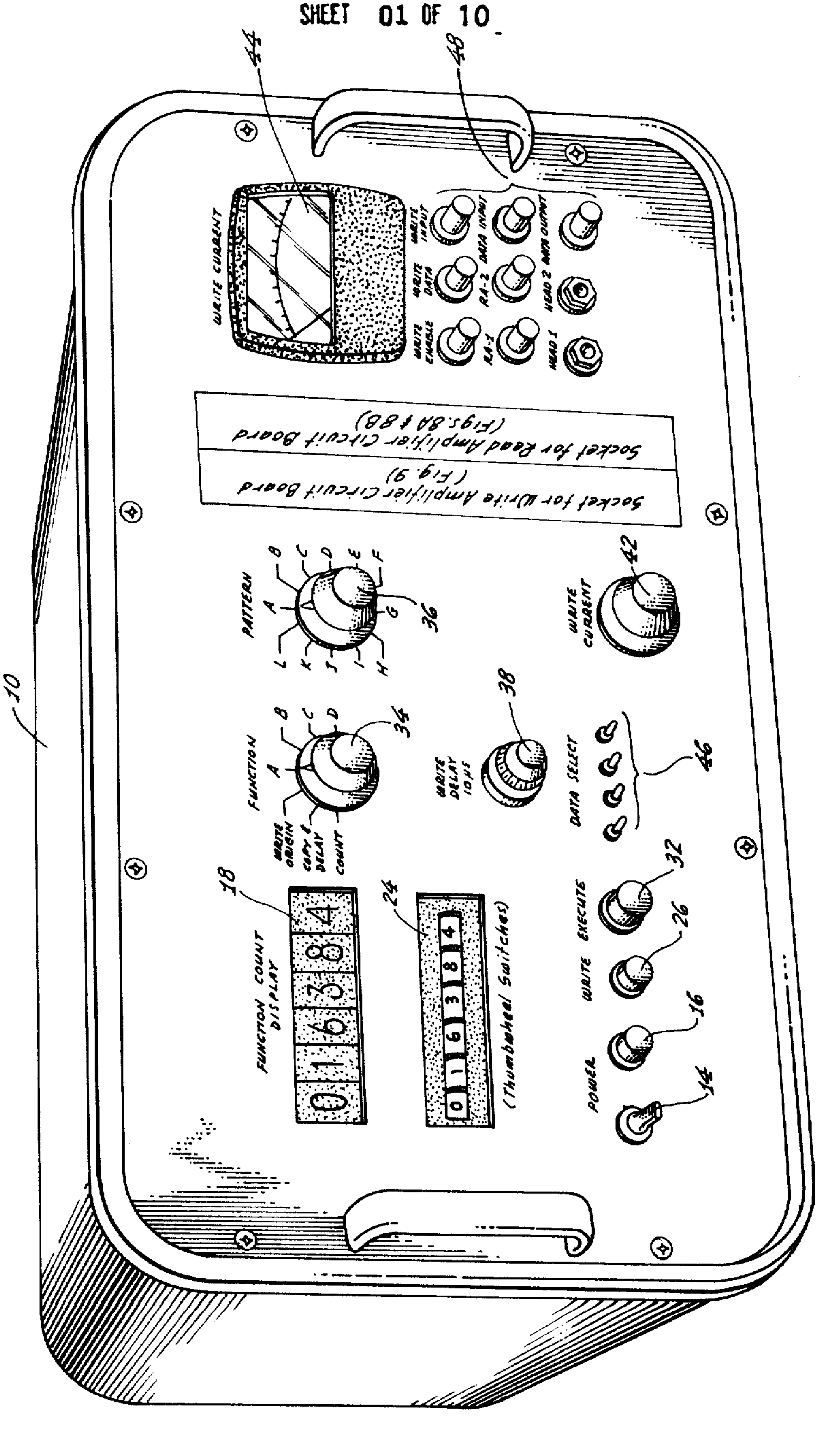
FIG. 1 is a perspective representation of a sector track recorder instrument constructed to incorporate the concepts of the present invention.

The instrument shown in FIG. 1, for example, is capable of writing appropriately timed signals into the sector tracks and address tracks of rotating magnetic drum and disc memories contained, for example, in digital computer or data processing equipment. The instrument is capable of writing origin pulses and multiple index markers with variable calibrated widths into such rotating magnetic drum or disc memories. Furthermore, the instrument has the capability of copying data from one track of such a rotating drum or disc memory and of transferring the data to another track in the memory, and of inserting a variable calibrated delay into the transfer if so desired. The instrument is also capable of counting the bits in any track of such a rotating magnetic drum or disc memory, of verifying the track bit count, and of counting the revolutions of the drum or disc to verify the spindle speed. The instrument also has the capability of counting the number of bits in a track on such a rotating magnetic drum or disc memory over one revolution of the rotating memory, or of averaging the count over a plurality of revolutions so as to obviate the one bit ambiguity.

A constructed embodiment of the instrument is designed to write into a sector or address track a 10 microsecond NRZ origin pulse, or single or multiple pulses with variable calibrated widths. The pulses may be at a random location, or synchronized with an existing clock, or other marker. Sector markers may be written into the sector or address track by the instrument of the invention by counting an existing clock, and by writing a variable width marker after each preset number of bits. As mentioned above, the instrument of the invention can copy any arbitrary data from one track of the rotating magnetic drum or disc memory to another track, and can insert a variable calibrated delay into the transfer up to 1 microsecond. This latter feature permits clock or sector tracks of the memory to be phase shifted so as to match other tracks. The instrument of the invention is also capable of many other functions, such as copying any data onto two tracks of a rotating drum or disc memory simultaneously, and of simultaneously writing one clock bit on one track of the memory, and a sector or address track on another.

As shown in FIG. 1, the instrument of the invention may be contained in an appropriate housing 10 having a front panel 12. Various controls, displays, meters, receptacles, and the like are mounted on the front panel.

For example, the illustrated embodiment includes a power switch 14 and an accompanying lamp 16 which is energized to indicate when the power is on. A function count window is provided in the front panel which, in the illustrated embodiment, reveals a six-digit display 18 which may be of the Nixie type. The display 18 displays the contents of a six-digit counter 20 (FIG. 2) when the counter is internally programmed by appropriate counter control logic as represented by the block 22 in FIG. 2. The counter 20 is contained on two circuit boards.

A set of thumb wheel switches designated 24 are also provided on the front counter, and these thumb wheel switches are used to establish a particular count at which an event is to occur. For example, most of the pattern logic cards, to be described, use the thumb wheel switches 24 to set the number of bits per sector. In the Write Origin function, for example, the thumb wheel switches 24 establish the number of bit clock pulses which occur between the marker pulses written in that mode.

Figure 2:
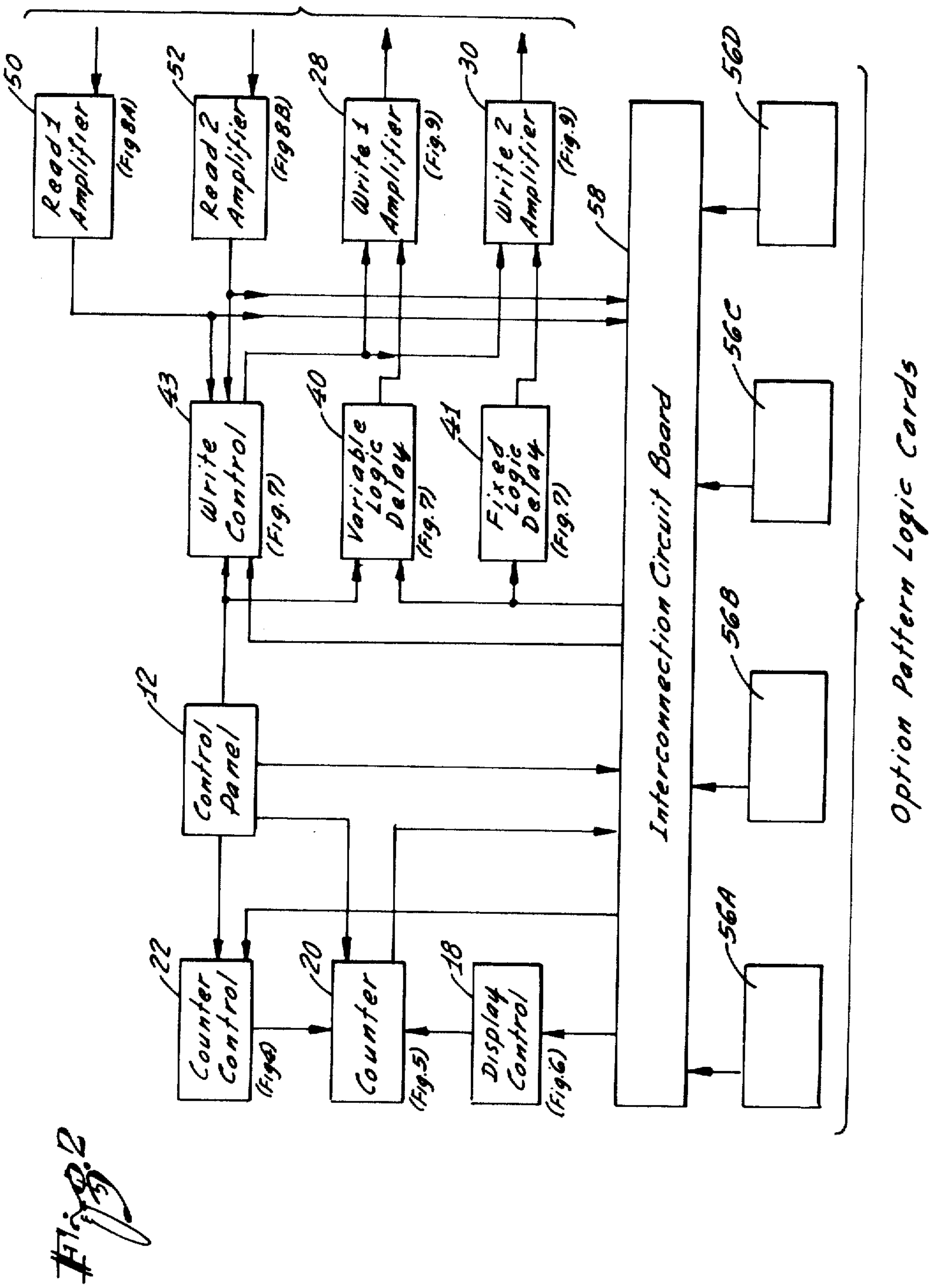
FIG. 2 is a block diagram of the electronics incoporated into the system of FIG. 1.

A write push button 26 is provided on the front panel which, when actuated, enables a pair of write amplifiers 28 and 30 in FIG. 2 for as long as the switch 26 is depressed, and for an additional few seconds after the switch is released. When the instrument of the invention has been set up to write a particular pattern or pulse on the rotary memory of the equipment to which it is connected, the write push button 26 is momentarily depressed to cause the actual writing to occur.

An execute push button 32 is also provided on the front panel which initiates operations in the instrument, other than writing, and such as counting, by way of example.

A function switch 34 is also provided which is a rotary switch, and which is turned from one position to another to establish different functions within the instrument. That is, the function switch 34 controls the basic operating modes of the instrument. In the "count" position of the switch, all operations which involve counting and displaying the result are performed. In the "copy and delay" position of the switch, data tracks may be read, the data may be delayed, and then rewritten to establish any desired phase relationship between tracks. In the "write origin" position of the switch, various width origin or index markers may be written. The remaining positions of the function switch 34 are labeled A–D, and are used for particular user patterns, as established by individual pattern boards which may be plugged into the instrument, and which are wired in accordance with a user's individual specification.

A similar rotary switch 36 is provided which is designated the "pattern" switch, and which serves to establish variations of the basic functions and basic patterns, such as which of the two amplifiers 28 or 30 will be enabled, or whether the source of input data is a read amplifier or a logic connector, or other variations. A write delay potentiometer 38 is provided on the control panel 12 which controls a variable logic delay circuit 40 in FIG. 2 to the write amplifier 28. This potentiometer establishes the width of the pulse in certain marker writing operations. The potentiometer is calibrated from 1 microsecond full scale, and the calibrations read directly in nanoseconds.

A write current potentiometer 42 is also provided on the control panel 12 which controls the block 43 of FIG. 2, and thereby establishes the magnitude of the recording current, which can be read on the write current meter 44. Four data select switches 46 are provided, and which are numbered 1,2,4 and 8, and these switches are used in conjunction with the aforesaid pattern generation circuit boards which are selectively plugged into the instrument to service the individual needs of the user.

A series of terminals and plugs 48 are also provided on the control panel 12 directly under the write current meter 44. These terminals include a Write Enable output terminal, at which a logic output appears which is true when the internal write amplifier 28 is enabled, and it may be used to drive an external write amplifier or other logic. The write data output terminal produces the output data from the write amplifier 28 for recording in the memory system when the write push button 26 is pressed. The write input terminal is used to supply external data to the write amplifier 30 when the dual write amplifier is to be used.

The RA1 output terminal provides data for the read amplifier 50 of FIG. 2, whereas the RA2 terminal provides data for the read amplifier 52. The Data Input terminal is used to supply logical data to certain of the special pattern circuit cards which require it. The Data Output terminal provides a logic output which, in the count, copy and delay, or write origin functions, is true for one bit time after the number of bits set on the thumb wheel switches 24 has been counted through the read amplifier 52. The Head 1 jack provides a connection to the recording head of one track of the rotating memory system, and the Head 2 jack provides a connection for the recording head of a second track.

The read amplifiers 50 and 52 are AGC controlled and are connected respectively to the jacks Head 1 and Head 2 of FIG. 2. Each of the read amplifiers has a linear pre-amplifier with automatic gain control having rapid attack and slow decay characteristics. The outputs of the linear pre-amplifiers are available at the terminals RA1 and RA2. The two read amplifiers are mounted on one circuit board which is received in a socket on the front panel of the instrument as shown in FIG. 1.

The write amplifiers 28 and 30, together with the read amplifiers 50 and 52 are selectively connected to the Head 1 and Head 2 jacks, by an appropriate setting of the function switch 34, as described above. The write amplifier 28 is connected to the Head 1 or Head 2 jack selectively, whereas the second write amplifier 30 is connected only when it is desired to use two write amplifiers to write on two tracks simultaneously, for example, while reading a third track. The write amplifiers likewise are mounted on one circuit board which also is received in a socket in the front panel of the instrument, as shown in FIG. 1.

The aforesaid special function or option pattern logic cards or boards are designated 56A–56D in FIG. 2, and are connected into the instrument by an interconnection circuit controlled by the counter 20 and by the controls on the control panel 12, and its output is applied to the write amplifier 28 through the variable logic delay circuit 40, and is applied to the write amplifier 30 through a fixed logic delay circuit 41. The interconnection circuit on the circuit board 58 is a bus structure which consists of a plurality of circuit lines, some of which carry signals to the blocks of FIG. 2 from the pattern logic boards, some of which carry signals from the block of FIG. 2 to the pattern logic boards, some of which distribute power, and some of which are connected to the control panel switches, such as the switches 34 and 36 of FIG. 1.

All the outputs to the buses are "open-collector," TTL gates, so that several outputs may be introduced to the various buses, and the particular output which drives the bus is qualified by logic associated with that output. Thus, for example, one circuit line of the bus structure is connected to the input of the fixed logic delay circuit 41 of FIG. 2. All of the sub-network pattern logic boards 56A, 56B . . . installed in the instrument are connected to that particular line, but only one at any particular time is selected and qualified to drive the bus.

Likewise, certain of the circuit lines in the bus structure are connected to the function switch 34 of FIG. 1, and certain others are connected to the pattern switch 36.

Figure 3:
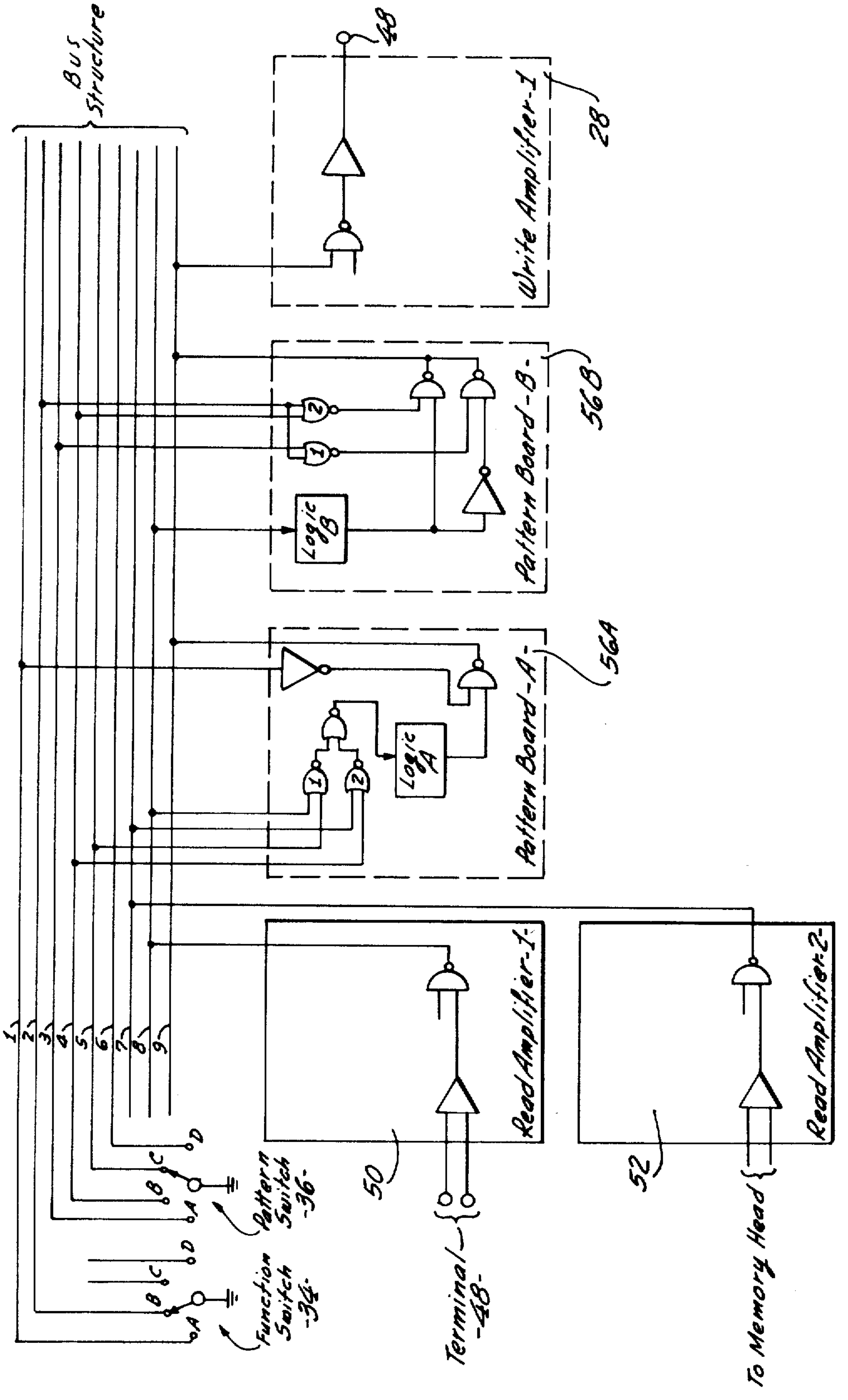
FIG. 3 is a simplified diagram of the manner in which certain of the blocks of FIG. 2 are interconnected.

As shown in FIG. 3, which is a simplified example of the bus structure, lines 1 through 9 are included in 44 lines contained in the bus structure in the constructed embodiment. The common elements, such as the read amplifiers 50 and 52 and write amplifier 28 are selectively and permanently connected to the bus lines. The plug-in sub-network pattern boards, such as the boards 56A and 56B have access to all of the lines of the bus structure, and individual pattern boards may be constructed to use any or all of the lines, as required.

In the example of FIG. 3, lines 1 and 2 of the bus structure are connected to terminals A and B of the Function switch 34, and lines 3,4,5 and 6 of the bus structure are connected to terminals A,B,C and D of the Pattern switch 36. Line 7 of the bus structure is connected to the output of the read amplifier 52, and line 8 of the bus structure is connected to the output of the read amplifier 50. In addition, line 9 of the bus structure is connected to the input of the write amplifier 28.

When the Function switch 34 is connected to the A terminal, and the pattern switch 36 is connected to the C terminal, then the output of the pattern board 56A is qualified, and is thus gated onto the bus structure, so that signal flows from the logic A element on the pattern board 56A to the write amplifier 28. The input to the logic A element on the pattern board 56a is received from the read amplifier 50 through an input gate 1 on the pattern board 56A, since the input gate 1 is qualified by the pattern switch 36 in the C position.

If the Function switch is at the A terminal, and the pattern switch is at the B terminal, the write amplifier 28 will receive logic A data from the pattern board 56A, but with input from the read amplifier 52. If, on the other hand, the Function switch 34 is a the B position, and the pattern switch is at the B position, the writer amplifier 28 will receive logic B data from the pattern board 56B, and input from the read amplifier 50. Again, if the function switch is at the B position, and the pattern switch 36 is at the A position, the write amplifier 28 will receive logic B data from the pattern board 56B, but it will be inverted.

In the foregoing example, the logic A circuit and the logic B circuit may be very different from one another, and be suitable for totally different memory systems.

Although the example of FIG. 3 shows the main logic selection by the function switch 34, and the minor variations selected by the pattern switch 36, it will be obvious that the routing of data through various logic subnetworks on the different pattern boards 56A, 56B, 56C, etc., can be responsive to any desired conbinations of the switches 34 and 36. In the constructed embodiment, there are 48 combinations available, from four function positions and 12 pattern positions. Although the block diagram of FIG. 2 shows four separate pattern boards 56A–56D being connected into the system, other numbers can be accommodated. For example, the constructed embodiment of the invention has card slots to accommodate as many as seven pattern boards.

Figure 4:
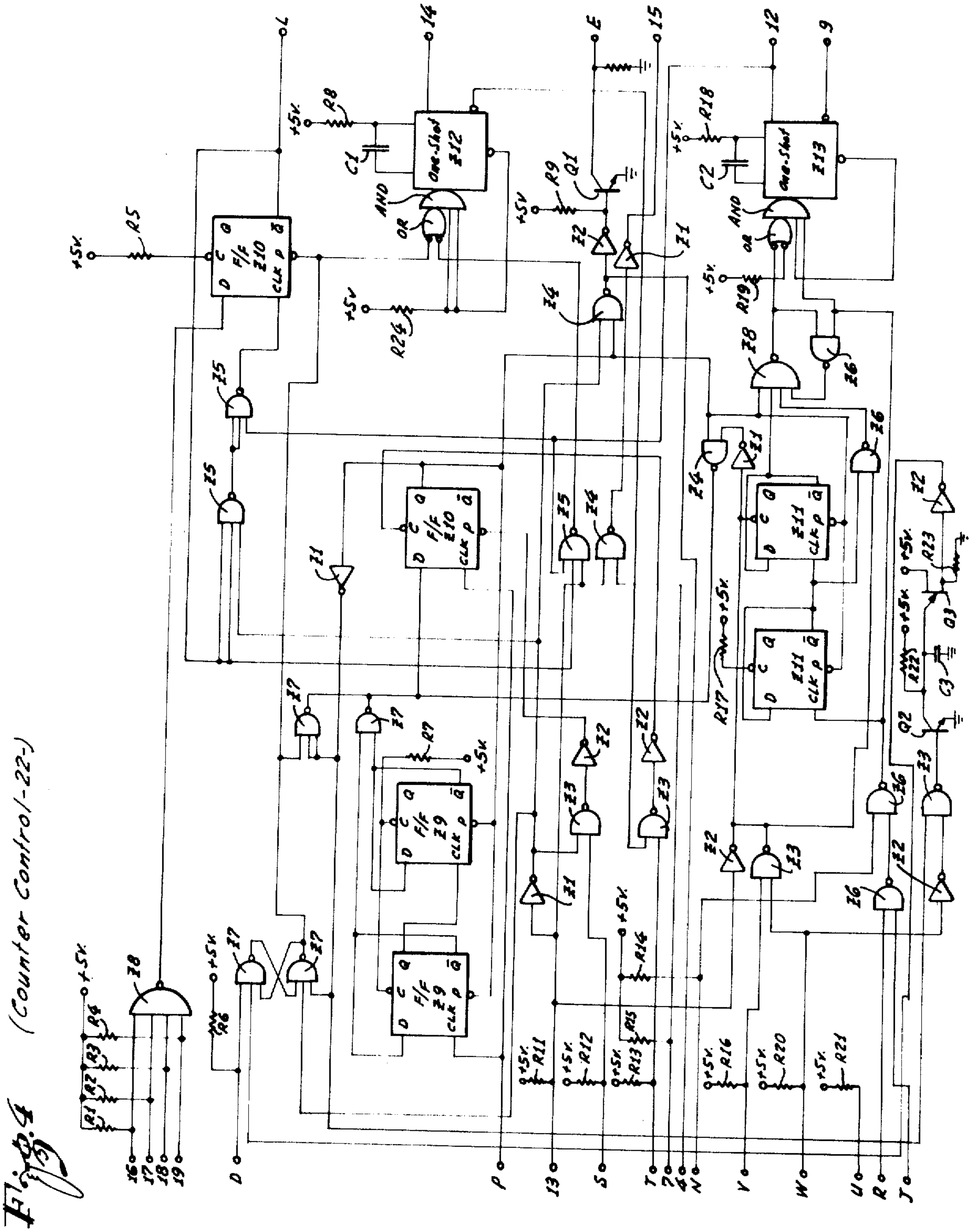

The circuit details of the counter control 22 of FIG. 2 are shown in FIG. 4. The circuit of FIG. 4 has input terminals designated W,V,U,T and S which are respectively connected to the contacts A,B,C,D and E of the pattern switch 36 shown in FIG. 1. The circuit also has an input terminal J which receives an enable signal from the write control circuit 43 of FIG. 2 when switch 36 is in any of its positions A –E. In addition, the circuit has input terminals P and R which respectively receive signals from the read amplifiers 50 and 52. The circuit receives clock signals by way of the input terminal N, these being supplied to the interconnection board 58 of FIG. 2 for use by the pattern logic boards 56A–56D. The circuit has an input terminal D which is connected to the execute switch 32 of FIG. 1. The input terminals 4,7 and 13 are connected to front panel controls of FIG. 1. The input terminals 16,17,18 and 19 receive count signals from the counter 20, so that the counter may be stopped at any predetermined count.

The circuit of FIG. 4 supplies clock output signals at the output terminals 12 and 9. It provides a blanking signal at output terminal 15 which is introduced to the display control 18 to blank the display at appropriate times. An output signal is provided at the output terminal E which lights a lamp in the execute button 32 of FIG. 1. A reset signal is provided at the output terminal 14 which serves to reset the counter 20. Data output is provided at the terminal L which is connected to the data output terminal 48 of FIG. 1 through the write control circuit 43, the output being inverted by circuitry of the write control circuit.

As illustrated, the circuit of FIG. 4 is made up of a plurality of solid state elements designated Z1—Z13.

These solid state elements may be of the type presently identified as follows:

| | | |
|---|---|---|
| Z1—SN7404N | Z6—SN7400N | Z10—SN7474N |
| Z2—SN15836N | Z7—SN15862N | Z11—SN7474N |
| Z3—SN15846N | Z8—SN7420N | Z12—SN74122N |
| Z4—SN15846N | Z9—SN7474N | Z13—SN74122N |
| Z5—SN7410N | | |

Of the resistors shown in the circuit, the resistors R1, R2, R3, R4, R5, R6, R7, R9, R11, R12, R13, R16, R17, R19, R20, R21, Each has a value of 1 Kilo-ohms. R8 has a value of 5.11 kolo-ohms. R10 has kilo-ohms. value of 1 kilo-ohm. R18 has a value of 5.11 kilo-ohms. R22 has a value of 33 kilo-ohms. R23 has a value of 33 ohms.

The transistor Q1 is of the type presently designated 2N4400, the transistor Q2 is of the type designated 2N4274, and the field effect transistor Q3 is of the type designated 2N4870. The capacitor C1 has a capacity of 10 picofarads, and the capacitor C2 has a capacity of 47 picofarads.

Figure 5:
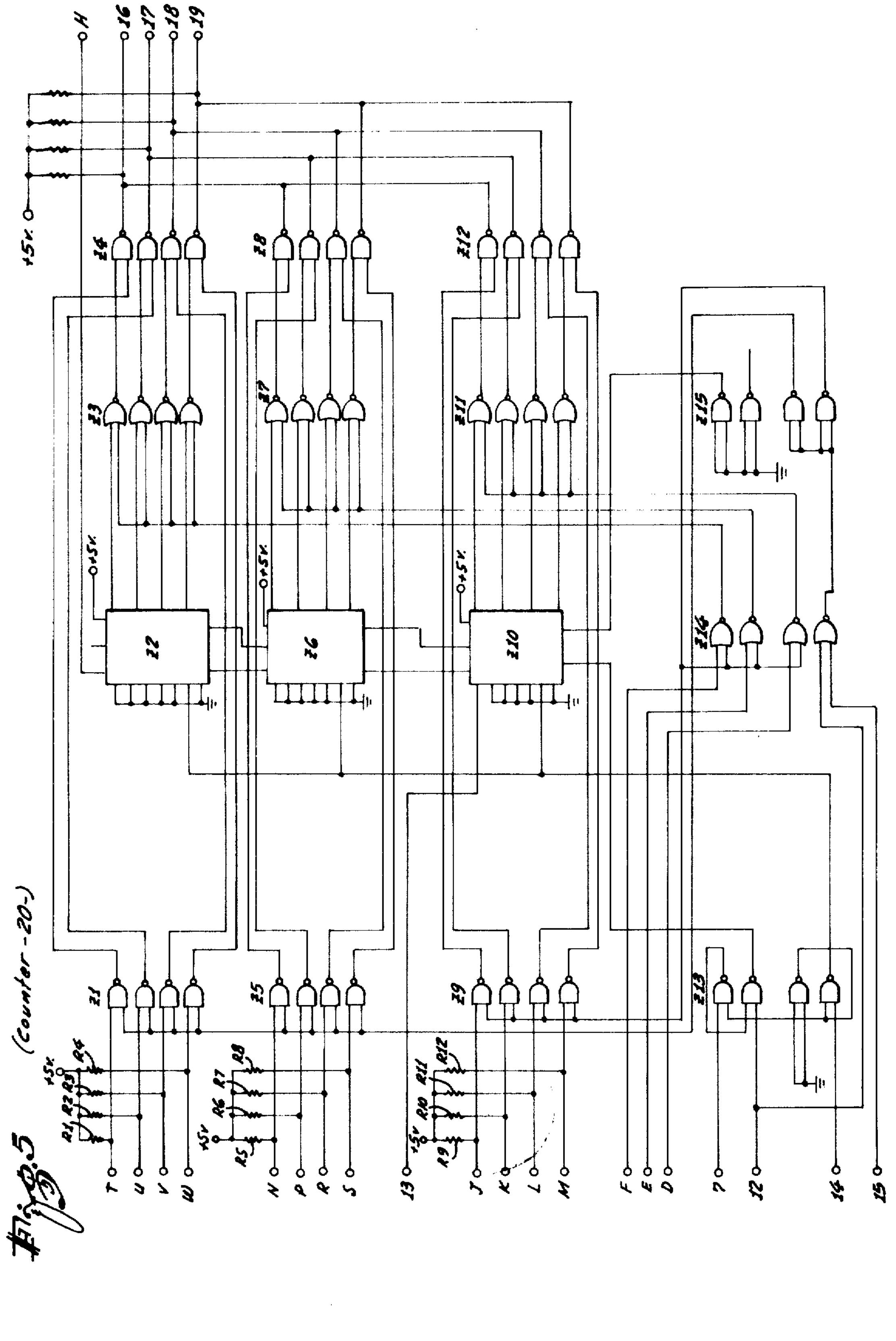

The circuit for the counter 20 is shown in FIG. 5. The circuit of FIG. 5 represents one of the two counter boards, corresponding, for example, to three of the six digits. As mentioned above, a second similar counter board is included in the system, which corresponds to the other three digits displayed by the display 18 of FIG. 1.

The circuit of FIG. 5 includes input terminals J, K, L, M, N, P, R, S and T, U, V, W, which are connected to corresponding terminals of the thumbwheel switches 24 of FIG. 1. The circuit also includes an input terminal 13 which provides an enable signal whenever the pattern switch 36 is set to its positions A–E. The circuit has input terminals F, E and D which derive time sharing gate signals from the display control 18 of FIG. 2, and which is shown in detail in FIG. 6. The circuit has an input terminal 7 which receives a carry signal from the other circuit board, and it has input terminals 12, 14 and 15 which receive corresponding signals from the counter control circuit of FIG. 4. For example, the terminal 12 receives the clock signal from the circuit of FIG. 4, the terminal 14 receives the reset signal, and the terminal 15 receives the blanking signal.

The circuit of FIG. 5 has an output terminal H which introduces the carry signal to the other counter circuit board. It also has output terminals 16, 17, 18 and 19 which supply the gate signals to the correspondingly numbered input terminals of the counter control circuit of FIG. 4.

The circuit of FIG. 5 includes the illustrated solid state logic components designated Z1–Z15. These components may be of the type presently designated as follows:

| | |
|---|---|
| Z1—SN7400N | Z9—SN7400N |
| Z3—SN7402N | Z11—SN7402N |
| Z4—SN7403N | Z12—SN7403N |
| Z5—SN7400N | Z13—SN7400N |
| Z7—SN7402N | Z14—SN7402N |
| Z8—SN7403N | Z15—SN7400N |

The resistors R1-R12 may each have a value of 6.2 kilo-ohms. The resistors R13-R16 may each have a value of 2.2 kilo-ohms.

The display control circuit 18 of FIG. 2 is shown in circuit detail in FIG. 6. The circuit includes an input terminal 15 which receives the blanking signal from the correspondingly numbered output terminal of the counter control circuit 22 of FIG. 4. The circuit includes input terminals 16, 17, 18 and 19 which receive signals from the correspondingly numbered output terminals of the counter 20 of FIG. 5.

The display control circuit 18 of FIG. 6 includes output terminals 9, 10, 11, 12, 13 and 14 at which time shared outputs appear and which are introduced to the anodes of the six display tubes constituting the display 18. Each of the display tubes has ten cathodes, each corresponding to a different digit. The signals at the output terminals 9–14 select the individual display tubes on a time shared basis, and corresponding signals at the output termnals L–W activate the cathodes of the selected display tube, so that the particular digit may be displayed. The circuit also has output terminals designated D, E, F and 4, 5, 6 which supplies gate signals to the input terminals E, E, F of the counter circuit 20 of FIG. 5, and to the corresponding input terminals 4, 5 and 6 of the equivalent counter circuit card.

The circuit of FIG. 6 includes solid state logic elements designated Z1–Z8, and these may be of the type presently designated as follows:

| | |
|---|---|
| Z1—SN 15846N | Z5—SN7474N |
| Z2—SN15846N | Z6—SN7474N |
| Z3—SN15836N | Z7—SN7404N |
| Z4—SN7474N | Z8—DM8840 |

The transistors Q1-Q6 may be of the type designated 2N5550. The Zener diodes CR1, CR3, CR5, CR7, CR9 and CR11 may be of the type designated IN5271. The diodes CR2, CR4, CR6, CR8, CR10 and CR12 may be of the type designated SI2. The resistors R1, R2, R3, R4, R5 and R6 may each have a value of 1 kilo-ohm. The inductive units T1-T6 may be of the type presently designated W588A. The field effect transistor Q7 may be of the type designated 2N4870. The resistor R8 may have a value of 39 kilo-ohms, the resistor R9 may have a value of 100 ohms, the resistor R10 may have a value of 1 kilo-ohm, the capacitor C1 may have a value of 0.002 microfarads, and the diode CR13 may be of the type designated IN4148. The resistor R7 may have a value of 1 kilo-ohm.

The write control circuit 43, and the variable and fixed logic delay circuits 40 and 41 are shown in circuit detail in FIG. 7.

The circuit includes an input terminal M which receives data from a pattern logic board 56A by way of the interconnection board 58, which is utilized by the variable delay logic circuit 40 and subsequently introduced into the write amplifier 28 by way of the output terminal 19. The circuit also has an input terminal 17 which is connected to the write input terminal of the group 48 shown in FIG. 1. The circuit includes an input terminal 11 which is connected to the write origin contact of the function switch 34 of FIG. 1. In addition, the input terminals W, V, U and T are connected to the A, B, C and D contacts of switch 34 respectively. The input Terminal 12 is connected to the copy and delay contact of the switch 34. The input terminals P and R are respectively connected to the outputs of the read amplifier 50 and read amplifier 52.

The input terminal 13 is connected to the count contact of the switch 34. Terminal 8 is an output terminal which is connected to the input terminal J of the counter control circuit 22 of FIG. 4. The terminal 10 is an input terminal which is connected to the output terminal L of the counter control of FIG. 4 to receive the data output from that terminal. The terminal L is an input terminal which receives a signal from the option logic cards 56A–56D by way of the interconnection circuit board 58. The input terminal 9 is connected to the panel write switch 26. The input terminal J receives a selection signal from the pattern logic board by way of the interconnection circuit board 58, and which designates which write amplifier is to be selected. A write amplifier enable signal is received from the particular pattern logic board by way of the input terminal K, and the signals applied to the input terminals J and K are processed in the circuit to provide corresponding outputs at the output terminals 14 or 15 so as to select and enable either the write amplifier No. 1 (block 28) or the write amplifier No. 2 (block 30).

As mentioned above, option card data for the write amplifier No. 1, and which is to be processed by the variable logic delay circuit 40 is applied to the circuit of FIG. 7 by way of the input terminal M. Option card data for the write amplifier No. 2, on the other hand, for processing by the fixed logic delay circuit 41, and for application to the write amplifier No. 2 is applied to the input terminal N. As also stated, the data output for the write amplifier No. 1 appears at the output terminal 19, whereas the output data for the write amplifier No. 2 appears at output terminal 16. The circuit also includes an output terminal 18 which is connected to the data output terminal of the group 48 of FIG. 1. As stated above, this output signal is inverted by the circuit of FIG. 7. Finally, the circuit has an output terminal H which supplies an energizing signal to the light bulb in the write switch 26 of FIG. 1.

The circuit of FIG. 7 includes solid state logic elements designated Z1–Z14, and these elements may be of the following types:

| | |
|---|---|
| Z1 — SN7402N | Z8 — SN7410N |
| Z2 — SN7402N | Z9 — SN15836N |
| Z3 — SN7402N | Z10 — SN7404N |
| Z4 — SN7403N | Z11 — SN72514N |
| Z5 — SN7403N | Z12 — SN72747N |
| Z6 — SN7400N | Z13 — SN7474N |
| Z7 — SN7400N | Z14 — SN74122N |

The transistors Q1, Q2 and Q7 may be of the type designated 2N4274. The transistors Q3, Q4, Q5 and Q6 may be of the type designated 2N4248. The transistor Q12 may be of the type designated 2N2219. The Zener diode CR2 may be of the type designated 1N5242, the Zener diode CR5 may be of the type designated 1N5228; and the diodes CR1, CR3, CR4, CR6, CR7, CR11 and CR12 may be of the type designated 1N4148. The resistors R1, R11 and R14 may have a value of 1 kilo-ohm. The resistor R2 may have a value of 390 ohms, the resistors R4, R6, R8 and R9 may have a value of 511 ohms. The resistors R7, R10, R12 and R13 may have a value of 2.2 kilo-ohms. The resistor R15 may have a value of 3.3 kilo-ohms, the resistor R16 may have a value of 4.7 kilo-ohms, the resistor R17 may have a value of 10.2 kilo-ohms, and the resistors R18 and R19 may each have a value of 5.11 kilo-ohms. The resistor R44 may have a value of 2.2 kio-ohms. The capacitors C3 and C4 may each have a value of 33 picofarads, the capacitors C5 and C6 may each have a value of 1,000 picofarads. The potentiometers R3 and R5 may each have a value of 100 ohms. The capacitors C7 and C8 may each have a value of 4.7 microfarads.

The resistors R20, R21, R22, R23, R33, R34, R35, R41 and R42 may each have a value of 2.2 kilo-ohms. The resistors R25 and R26 may each have a value of 1 kilo-ohm. The resistor R24 may have a value of 2.2 kilo-ohms, and the resistor R28 may have a value of 5.11 kilo-ohms. The resistors R45 and R46 may each have a value of 1.8 kilo-ohms. The transistor Q8 may be of the type designated 2N4248. The Zener diode CR8 may be of the type designated 1N5242. The resistor R30 may have a value of 10 kilo-ohms, and the resistor R32 may have a value of 820 ohms. The capacitor C9 may have a value of 220 picofarads.

The resistor R36 has a value of 10 kilo-ohms, the resistor R47 has a value of 1 kilo-ohm, the resistor R38 has a value of 330 ohms, the resistor R39 has a value of 33 ohms, the resistor R37 has a value of 33 kilo-ohms, the resistor R48 has a value of 6.2 kilo-ohms, the resistor R49 has a value of 100 ohms and the resistor R50 has a value of 100 ohms. Finally, the resistor R43 has a value of 1 kilo-ohm.

The diodes CR9 and CR10 may be of the type designated 1N4148. The capacitor C10 may have a value of 47 microfarads, the capacitor C11 may have a value of 1,000 picofarads, as may the capacitors C12 and C13. The resistor R40 has a value of 15 kilo-ohms.

The transistor Q10 may be of the type designated 2N4274, the transistor Q11 may be of the type designated 2N4400, and the field effect transistor Q9 may be of the type designated 2N4870. The resistor R27 has a value of 2.2 kilo-ohms.

The read amplifier No. 1 represented by the block 50 in FIG. 2, is shown in circuit detail in FIG. 8. The read amplifier includes a pair of input terminals designated U and V which receives a differentiated input from the Head No. 1 terminal of the group 48 of FIG. 1. The read amplifier has output terminals P and N which provides the read output signals to the interconnection board 58 and to the correspondingly lettered input terminals of the write control circuit of FIG. 7.

The read amplifier circuit of FIG. 8A includes logic elements designated Z3 which may be part of an integrated circuit presently designated PM2033. The read amplifier No. 2 shown in circuit detail in FIG. 8B also includes two logic gates designated Z3 which are also part of the same integrated circuit. The read amplifier of FIG. 8A includes an integrated circuit designated Z1 which may be of the type presently identified LM710C.

Resistors R1 and R3 may have a value of 7.5 kilo-ohms. The resistor R2 has a value of 1.5 kilo-ohms. The resistors R4, R5, R6 and R7 may each have a value of 3.2 kilo-ohms. The resistors R8 and R9 may each have a value of 4.7 kilo-ohms. The resistor R10 may have a value of 22 kilo-ohms, the resistor R11 may have a value of 120 ohms, the resistor R12 may have a value of 4.7 kilo-ohms, the resistor R13 may have a value of 2.2 kilo-ohms, the resistor R14 may have a value of 2.2 kilo-ohms, the resistor R15 may have a value of 1.8 kilo-ohms, the resistor R16 may have a value of 2.2 kilo-ohms, the resistor R17 may have a value of 2.2 kilo-ohms, the resistor R18 may have a value of 120 ohms, and the resistor R20 may have a value of 15 kilo-ohms.

The capacitors C1 and C2 may each have a value of 0.15 microfarads. The capacitor C3 may have a value of 10 microfarads, and the capacitor C5 may have a value of 22 picofarads. The transistor Q5 may be of the type designated 2N2222, the transistor Q4 may be a double transistor of the type designated PM146, as may the transistor Q2.

The remaining transistors are PNP transistors of the type designated 2N2907. The illustrated diodes may be of the type designated 1N914. The capacitor C6 may have a value of 0.01 microfarads, and the capacitor C7 may have a value of 0.15 microfarads, and the capacitor C9 may have a value of 33 microfarads.

The resistor R23 may have a value of 1 kilo-ohm, the resistor R22 may have a value of 1.2 kilo-ohms, the resistor R74 may have a value of 10 megohms, the resistor R24 may have a value of 470 ohms, the resistors R25 and R26 may each have a value of 4.7 kilo-ohms, the resistor R27 may have a value of 1.5 kilo-ohms, the resistor R28 may have a value of 2.2 kilo-ohms, the resistor R29 may have a value of 15 kilo-ohms, the resistor R33 may have a value of 22 kilo-ohms, the resistor R31 may have a value of 3.3 kilo-ohms, the resistor R34 may have a value of 10 kilo-ohms, the resistor R32 may have a value of 1.5 kilo-ohms, and the resistor R35 may have a value of 1.5 kilo-ohms. The capacitor C22 may have a value of 5 picofarads. The transistors Q11 and Q15 may be of the type designated 2N2222. The Zener diode CR5 may be of the type designated 1N5235.

The read amplifier No. 2 as designated by the block 52 of FIG. 2 is shown in circuit detail in FIG. 8B. The latter amplifier circuit has input terminals F and E which receive a differentiated input from the head No. 2 terminal of the group 48 of FIG. 1. The amplifier also has output terminals L and K at which the read amplifier output appears.

The circuit of FIG. 8B includes NPN transistors Q20, Q26 and Q30 which may be of the type designated 2N2222. The transistor Q19 is a double transistor of the type designated PM146, as is the transistor Q17. The remaining transistors are PNP transistors, and may be of the type designated 2N2907. The resistors R36 and R38 may each have a value of 7.5 kilo-ohms, the resistor R37 has a value of 1.5 kilo-ohms, and the resistors R39, R40, R41 and R42 each has a value of 3.2 kilo-ohms. The capacitors C11 and C12 each has a capacity of 0.15 microfarads. The resistors R43 and R47 each has a value of 4.7 kilo-ohms, as has the resistor R47. The capacitor C13 has a value of 10 microfarads.

The resistor R45 has a resistance of 22 kilo-ohms, the resistors R48, R49, R51 and R52 each has a value of 2.2 kilo-ohms, the resistor R46 has a value of 120 ohms, the resistor R50 has a value of 1.8 kilo-ohms, the resistor R53 has a value of 120 ohms, the resistor R54 has a value of 680 ohms, and the resistor R55 has a value of 15 kilo-ohms. The capacitor C15 has a value of 22 picofarads, the capacitor C16 has a value of 0.01 microfarads and the capacitor C17 has a value of 0.15 microfarads. The resistors R56 and R57 each has a value of 1.2 kilo-ohms, the resistor R75 has a value of 10 megohms, the resistor R59 has a value of 470 ohms, the resistor R58 has a value of 1 kilo-ohm, the resistors R60 and R61 each has a value of 4.7 kilo-ohms, and the resistor R62 has a value of 1.5 kilo-ohms.

The capacitor C18 has a value of .15 microfarads, the capacitor C19 has a value of 33 microfarads, the capacitor C20 has a value of 4.7 microfarads, and the capacitor C23 has a value of 5 picofarads. The resistor R63 has a value of 2.2 kilo-ohms, the resistor R64 has a value of 15 kilo-ohms, the resistor R36 has a value of 3.3 kilo-ohms, as has the resistor R67. The potentiometer R65 has a value of 500 ohms, the resistor R70 has a value of 1.5 kilo-ohms and the resistor R68 has a value of 22 kilo-ohms. The diodes CR9, CR11, CR12, CR14 and CR15 may be of the type designated 1N914. The Zener diode CR13 may be of the type designated 1N5235. The resistor R69 has a value of 10 kilo-ohms. The circuit also includes an integrated circuit Z2 which may be of the type designated LM710C.

The write amplifiers 1 and 2 (blocks 28 and 30 of FIG. 2) are shown in circuit detail in FIG. 9. The No. 1 write amplifier may be formed by the transistors Q10, Q11, Q14 and Q15; whereas the No. 2 write amplifier may be formed by the transistors Q12, Q16, Q13 and Q17. Each of these transistors may be of the type designated 2N2905. However, toggle switches S1 and S3 are provided on the amplifier card, and when these are actuated, terminals 1 and 2 constitute the input terminals to the latter amplifier, and terminals 3 and 4 constitute the output terminals. In this condition, the latter amplifier functions as a third amplifier for the system, and the first amplifier is time shared to constitute the No. 1 and No. 2 write amplifiers.

The circuit of FIG. 8B includes an input terminal P to which the enable signal for the write amplifier No. 1 is applied, and a second input terminal 12 to which the enable signal for the write amplifier No. 2 is applied. The circuit also includes an input terminal M which is connected to the write enable terminal of the group 48 of FIG. 1. The input terminal 9 is connected to the write current dial switch 42 of FIG. 1, as is the input terminal K. The input from the head No. 1 of the group of terminals 48 of FIG. 1 is applied to the input terminals 17 and 18, and the input from the head No. 2 of the group 48 is applied to the input terminals 5 and 6. Center tap voltages for the head No. 1 and head No. 2 connections are respectively applied to the terminals V and E. The output terminals L and 10 are connected to the write meter 44. When the circuit is in its time sharing mode, the relays K1 and K2 operate to connect the time-shared write amplifier successively to the head No. 1 and to the head No. 2 front panel connectors.

The circuit of FIG. 9 includes a first integrated circuit element designated Z3 which may be of the type presently identified as PM2033, and a second integrated circuit designated Z4 which may be of the type presently identified PM2034. The circuit also includes a third integrated circuit Z2 which may be of the type designated PM2033.

The capacitors C1 and C2 may have a capacity of 6.8 microfarads. The resistor R2 may have a resistance of 6.2 kiloohms, the resistor R5 may have a resistance of 180 ohms, as may the resistor R6, the resistor R10 may have a resistance of 100 ohms, the resistor R11 may have a resistance of 22 kilo-ohms, the resistor R12 may have a resistance of 3.9 kilo-ohms, as may the resistor R13. The resistor R14 may have a resistance of 22 kiloohms and the resistor R15 may have a resistance of 300 ohms. The transistor Q1 and Q2 may be of the type designated 2N2222, and the transistors Q3 and Q4 may be of the type designated 2N2907. The Zener diode CR2 may be of the type designated IN5226.

The transistors Q5, Q6 and Q9 may be of the type designated 2N2222. The resistor R9 may have a resistance of 10 kiloohms, as may the resistor R17. The resistors R26, R27, R28 and R29 may each have a resistance of 47 Kilo-ohms. The resistors R30 and R31 may each have a resistance of 22 kilo-ohms. The diodes CR 9, CR12, CR29, CR30, CR32 and CR33 may be of the type designated FDH600. The resistors R49 and R50 may each have a resistance of 680 ohms, and the capacitors C9 and C10 may have a capacity 100 picofarads. The capacitor C11 may have a capacity of 6.8 micro-farads. The transistors Q22 and Q23 may be of the type designated MJE2955. The resistors R53 and R54 may each have a resistance of 2.2 kilo-ohms. The Zener diodes CR34 and CR35 may be of the type designated 1N5245.

The diodes CR37, CR38, CR39 and CR40 may each be of the type designated FDH600. The transistor Q25 may be of the type designated 2N2222, the resistor R56 may have a resistance of 4.7 kilo-ohms, and the capacitor C13 may have a capacity of 2.2 microfarads.

The resistors R22, R23, R32 and R33 may each have a resistance of 10 ohms, and the resistors R18 and R19 may each have a resistance of 2.2 kilo-ohms. The transistors Q7 and Q8 may be of the type designated 2N2905. The capacitor C3 and the capacitor C6 may each have a value of 6.8 microfarads, ans the capacitor C5 may have a value of 2,200 picofarads. The resistors R20 and R21 may each have a resistance of 2.2 kilo-ohms, and the resistors R24, R25, R34 and R35 may each have a resistance of 10 ohms. The transistor Q24 may be of the type designated MJE2955. The resistor R55 may have a resistance of 2.2 kilo-ohms, the resistor R51 may have a resistance of 15 ohms, the resistor R52 may have a resistance of 680 ohms, the capacitor C12 may have a capacity of 100 picofarads, and the Zener diode CR36 may be of the type designated 1N5245. The resistor R8 may have a resistance of 2.2 kilo-ohms, and the diodes CR7, CR10, CR13, CR24 and CR25 may be of the type designated FDH600. The resistor R36 may have a resistance of 1.5 kilo-ohms.

As mentioned above, the instrument of FIG. 1 is capable of several basic functions, these being counting, copy and delay, write origin, and for writing special patterns as determined by the particular option pattern cards 56A–56D of FIG. 2. As also described, the instrument is set to its various modes by the function switch 34.

With respect to the "counting function," all basic counting is carried on with the function switch 34 in the "count" position. With the function switch in the "count" position and the pattern switch 36 in the "A" position, the counter 20 counts the number of events on read amplifier 52 which occur over four successive periods between events on read amplifier 50, divides this number by 4, and displays it on the display 18. The count repeats automatically every few seconds. The execute switch lamp 32 is illuminated when the count gate is opened. The purpose of averaging over four periods is to eliminate the ±1 count ambiguity which may occur if only one period is counted, and if a event occurs exactly as the count gate is opened or closed.

With the function switch 34 in the "count" position and the pattern switch 36 in the "B" position, the operation is the same as described in the preceding paragraph, except that the count does not repeat automatically. A count for four periods occurs whenever the execute push button is pressed. When the function switch 34 is in the "count" position and the pattern switch 36 in the "C" position, the operation is the same as described in the preceding paragraph, except that the count occurs over one period only, and 18 does not divide by 4. Therefore, whenever the execute push button 32 is pressed, the counter counts and displays the number of events which occur on the read amplifier 52 between two successive events on the read amplifier 50.

When the function switch is in the "count" position and the pattern switch 36 in the "D" position, the count gate is closed. The counter 20 may be reset by the execute push button 32. This position of the pattern switch 36 is normally used for manual gate control, and is the gate closed position.

With the function switch 34 in the "count" position and the pattern switch 36 in the "E" position, the count gate is open, and the counter counts and displays the number of events occurring on the read amplifier 52. This position is normally used for manual gate control, and is the gate open position.

The copy and delay function is used for all operations which read and transfer data so as to obtain a phase delay. For example, with the function switch 34 in the "copy and delay" position, and the pattern switch 36 in the "A" position, the data read by the amplifier 50 is delayed in the variable delay logic 40 and written by the write amplifier 28. In this mode of operation, the data on a first track of the rotating memory system may be copied onto a second track with a delay equal to the setting of the write delay control 38, plus the inherent read/write delay of the memory system.

With the function switch 34 in the "copy and delay" position and with the pattern switch 36 in the "B" position, the operation is the same as described in the preceding paragraph, except that the data is read from the second track by the read amplifier 52, delayed and writen on the first track by the write amplifier 28. With the function switch in the "copy and delay" position and the pattern switch in the "C" position, the operation is the same except that the data is taken from the write input terminal, delayed and then written on the first track by the write amplifier 28.

When the function switch 34 is in the "copy and delay" position and the pattern switch 36 is in the "D" position, the data on the track 2 is read by the read amplifier 50, and a pulse is written on track 1 following each negative transition on track 2. The pulse width is set by the write delay control 38. This operation is useful for adjusting the symmetry of the clock tracks of the memory system.

In order to perform the "write origin" function, the function switch is set to the corresponding position. The "write origin" function is used to write single of multiple index markers in NRZ format on the first track of the memory system. With the function switch in the "write origin" position, and with the pattern switch 36 in the "A" position, an origin pulse of approximately 10 microseconds width is written on track 1 of the rotating memory system when the write push button 26 is pressed. The location of the pulse on the track is arbitrary.

With the function switch 34 in the "write origin" position, and the pattern switch 36 in the "B" position, the operation is the same as described above, except that the origin pulse is of the width set by the write delay control 38. With the function switch in the "write origin" position and the pattern switch in the "C" position, a pulse having a width set by the write delay control will be written in track 1 of the rotating memory each time the number of bits set by the thumb wheel switches 24 is counted on the read amplifier 52. This latter operation is usual for writing sector markers or for dividing the number of bits on a track of the rotating memory system.

Position A through D on the function switch 34 are used to write special patterns, as determined by the special pattern boards or cards 56A–56D. For example, a special pattern card may be provided which is intended to write a sector track containing all Ferranti "1's", except for a Ferranti 7-bit binary address at the start of each of 101 sectors of 408 bits each, and simultaneously to write a track containing one Ferranti "0" coincident with the last of the seven binary bits on the zero sector. such a card is described herein merely by way of example, it being understood that each individual user will have a card, or cards, suited to his individual requirements. The card in question has the capability of writing the pattern in NRZ or Ferranti, and also of writing a similar pattern containing all zeros except for the binary addresses, in NRZ or Ferranti.

The function card 56A is qualified by placing the function switch 34 in the "A" position. A bit clock, which should contain, for example, 41,208 bits, is read from the track connected to the Head 2 jack, and the sector track of the rotating memory receives its information from the Head 1 jack, whereas the Ferranti origin pulse is written in the original track of the rotating memory by the head which is connected to the write amplifier 30 through the data output terminal.

The write delay control 38 delays the sector track with respect to the origin track, and should initially be set to zero. When the pattern switch 36 is set to the "A" position, the resulting pattern will contain all "1's", except for the binary addresses, and when the pattern switch is set to the "B" position, the pattern will contain all "0's", except for the binary addresses. In the particular case under consideration, the thumb wheel switches 24 are set to 408, which is the number of bits per sector. To write the desired sector and origin track on the rotating memory system, the switches are set in the manner described above, and the write button 26 is pressed. When the read amplifier 50 is reading the bit clock correctly, the digital data to the write amplifiers is available at the write data and data output connectors. The sector track data is available on the write data connector, and the origin track data is available on the data output connector.

In addition to the foregoing, the instrument is capable of performing certain basic operations. For example, the instrument is able to count the number of bits on the clock track of the rotating memory system, this being achieved by connecting the track to the Head 2 jack, and connecting a spare track to the Head 1 jack. The function switch 34 is placed in the "write origin" position, and the pattern switch 36 is placed in the "A" position. The write button 26 is then depressed, and this writes an origin pulse on the spare track. Then, the function switch 34 is placed in the count position, leaving the pattern switch 36 in the "A" position. The bit count will now be displayed automatically by the display 18.

The instrument is also capable of determining the disc or drum speed of the rotating memory system, this being determined by connecting any spare track in the memory system to the Head 1 jack, writing an origin pulse in that track by pressing the write button 26, as in the preceding paragraph, with the function switch in the write position and the pattern switch in the "A" position. The memory system is then disconnected from the Head 1 jack and plugged into the Head 2 jack. The function switch is then placed in the composition, and the pattern switch in the "D" position. The execute button 32 is pressed to clear the counter 20. Then, by using a watch with a sweep second hand, the pattern switch 36 is moved from "D" to "E" for exactly 1 minute, and back to "D" again. The display 18 will then display the spindle speed directly in RPM.

Another special function of the instrument is to adjust the phase relationship between two tracks on the memory system. For example, of one data track is to be delayed in time to match another track, this may be accomplished by connecting the track to be delayed to the Head 1 jack, and by connecting a spare track in the memory system to the Head 2 jack. The function switch is then placed in the "copy and delay" position, and the pattern switch is placed at the "A" position. The write delay control 38 is set to zero. Then, the write push button 26 is pressed so that the track connected to the Head 1 jack may be copied into the track connected to the Head 2 jack. Then, after allowances have been made for the inherent delays in the system, the write delay control 38 is set to the desired delay. The pattern switch is then placed in the "B" position, and the write button 26 is pressed to copy the data from the Head 2 jack, back to the Head 1 jack. The data on the Head jack 1 is then delayed from the original data by the desired amount.

The instrument may also be used to adjust the symmetry of a uniform bit clock. This may be adjusted by placing the function switch 34 in the "count and copy" position, and by setting the pattern switch 36 in the "D" position. The write delay control 38 is set for slightly less than one-half period of the bit clock. Then, by pressing the write button 26, the clock from the jack Head 2 will be copied to the jack Head 1, with an asymmetrical wave shape having proportions determined by the setting of the write delay control.

The instrument may also be used to write an origin pulse with a particular width, this width being set by the write delay control 38. The head of the rotating memory system by which the origin pulse is to be written is connected to the Head 1 jack, and the function switch is placed in the "write origin" position, and the pattern switch is placed in the "B" position. Then, when the write button 26 is pressed, the origin pulse will be written at an arbitrary place on the track, and will have a width set by the width delay control 38.

Sector or index markers, spaced a particular number of bits apart, may also be written into a memory track by connecting the bit clock track of the memory to the Head 2 jack, and by connecting the track which is to receive the sector markers to the Head 1 jack. The function switch 34 is then placed in the write origin position, and the pattern switch 36 is placed in the "C" position. The number of bits which are to occur between markers, that is the number of bits per sector, are then set on the thumb wheel switches 24. This number should divide evenly into the total number of bits on the bit clock track. The desired width of the markers is set by setting the write delay control 38. Then, when the write button 26 is pressed, the sector track will be written by the head of the memory which is connected to the Head 1 jack.

The invention provides, therefore, an improved sector track recorder which, as described above, is capable of a variety of functions. For example, the instrument of the invention will count the number of bits on a track over one revolution, or averaged over four revolutions to escape the one bit ambiguity. It will count revolutions to determine the spindle speed of the rotating memory. It will write NRZ origin pulses, or single or multiple pulses with variable calibrated widths to 1 microsecond. The pulses may be at a random location, or synchronized with an existing clock or other marker. Sector markers may be written by counting an existing clock and writing a variable width marker after every set number of bits. The instrument of the invention is also capable of copying any arbitrary data from one track of the rotating memory to another track, and of inserting a variable calibrated delay into the data in the process. This latter feature permits the phase shifting of clock or sector tracks to match other tracks. Other functions have also been described, such as copying any data onto two tracks simultaneously, or simultaneously writing a bit clock on one head and a sector or address track on another head. The instrument also operates in conjunction with special plug-in pattern cards in order to write any special address or timing track as specified by the user, or to perform other special functions.

In general, the instrument of the present invention may be used in recording index markers, origin pulses, sector markers, special patterns, and other fixed data on rotating disc or drum memory systems.

It is apparent that although a particular embodiment of the invention has been shown and described, modifications may be made. It is intended to cover all modifications which fall within the spirit and scope of the invention in the following claims.

What is claimed is:

1. An instrument for recording index markers, sector markers, addresses and the like, in selected tracks of a rotating magnetic memory, and which comprises: read amplifier means, write amplifier means, terminal connectors for connection to selected read and write heads of the aforesaid memory; at least one circuit card having logic circuitry thereon representative of a particular logic pattern; and control circuitry interconnecting said read and write amplifier means, said circuit card and said terminal connectors for controlling the transfer of data therebetween.

2. The instrument defined in claim 1, and which includes a counter circuit, and a display means connected to said counter circuit for displaying the count thereon, and which includes a function switch connected to said counter circuit and to said control circuitry for selectively connecting said counter circuit in circuit with said read amplifier to perform a count function.

3. The instrument defined in claim 2, and which includes a pattern switch connected in circuit with said control circuitry selectively to determine the type of count function to be performed by said counter circuit.

4. The instrument defined in claim 1, and which includes delay logic circuitry, and a function switch connected to said delay logic circuitry and to said control circuitry for selectively connecting said read amplifier means to one track of the rotating magnetic memory so that data on said first named track may be copied onto said second named track with a predetermined delay, as established by said delay logic circuitry.

5. The instrument defined in claim 4, and which includes a write delay control connected to said logic delay circuitry for establishing the dealy exerted thereby on the aforesaid data.

6. The instrument defined in claim 1, and which includes a function switch connected to said control circuitry for selectively connecting an origin pulse source to said write amplifier means to cause said write amplifier means to write an origin pulse on one of the tracks of the rotating magnetic memory.

7. The instrument defined in claim 6, and which includes a switch connected in circuit with said function switch to cause said origin pulse to be written in the aforesaid track when said switch is actuated.

8. The instrument defined in claim 6, and which includes control means connected to said function switch for establishing said origin pulse at a particular width.

9. The instrument defined in claim 1, and which includes a function switch for selectively connecting said logic circuitry on said logic card to said control circuitry.

* * * * *